US012051399B2

(12) United States Patent
Murugesan et al.

(10) Patent No.: US 12,051,399 B2
(45) Date of Patent: Jul. 30, 2024

(54) EVALUATING SCREEN CONTENT FOR ACCESSIBILITY

(71) Applicant: JPMorgan Chase Bank, N.A., New York, NY (US)

(72) Inventors: Chandrasekar Murugesan, Frisco, TX (US); Sushama Addepalli, Frisco, TX (US); Xiang Zhang, Plano, TX (US); Sudharsan Selvakumar, Irving, TX (US); Sanjay Durgadin, Hockessin, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 456 days.

(21) Appl. No.: 17/541,011

(22) Filed: Dec. 2, 2021

(65) Prior Publication Data

US 2023/0178065 A1 Jun. 8, 2023

(51) Int. Cl.
| | | |
|---|---|---|
| G10L 13/04 | (2013.01) | |
| G06N 20/00 | (2019.01) | |
| G10L 21/007 | (2013.01) | |
| G10L 21/0208 | (2013.01) | |
| G10L 21/0364 | (2013.01) | |

(52) U.S. Cl.
CPC ............. G10L 13/04 (2013.01); G06N 20/00 (2019.01); G10L 21/007 (2013.01); G10L 21/0208 (2013.01); G10L 21/0364 (2013.01)

(58) Field of Classification Search
CPC ... G10L 13/04; G10L 21/007; G10L 21/0208; G10L 21/0364; G10L 21/043; G06N 20/00

USPC .......................................................... 704/260
See application file for complete search history.

(56) References Cited

U.S. PATENT DOCUMENTS

| | | | | |
|---|---|---|---|---|
| 8,521,526 | B1 * | 8/2013 | Lloyd ................. | G06F 16/3344 704/251 |
| 10,854,190 | B1 * | 12/2020 | Szentes ................ | G06F 40/226 |
| 11,250,096 | B1 * | 2/2022 | Reynolds ............... | G06F 9/451 |
| 11,393,507 | B1 * | 7/2022 | Dippon .................... | H04N 5/77 |
| 11,489,845 | B1 * | 11/2022 | Feng .................... | H04L 63/1408 |
| 11,805,189 | B1 * | 10/2023 | Manzanillo ........... | G06F 16/116 |
| 11,895,121 | B1 * | 2/2024 | Karim ..................... | H04L 63/20 |
| 2004/0145607 | A1 * | 7/2004 | Alderson ................. | G06F 9/451 715/746 |
| 2005/0246653 | A1 * | 11/2005 | Gibson ................. | G06F 16/957 707/E17.119 |
| 2008/0040115 | A1 * | 2/2008 | Asakawa ................ | G10L 13/00 704/260 |
| 2009/0055186 | A1 * | 2/2009 | Lance .................... | G10L 13/033 704/260 |

(Continued)

*Primary Examiner* — Thuykhanh Le
(74) *Attorney, Agent, or Firm* — Greenblum & Bernstein, P.L.C.

(57) ABSTRACT

In one example, a method for evaluating screen content for accessibility with a screen reader device is disclosed. The method provides a baseline document including a script of expected screen content that conforms accessibility requirements. The method may generate an audio file based on screen content elements. For some implementations, the method uses a machine learning model to transcribe the audio file into an output transcription file. The method may determine whether output transcription file matches the baseline document and a corresponding output report is generated.

20 Claims, 8 Drawing Sheets

(56) References Cited

U.S. PATENT DOCUMENTS

| | | | |
|---|---|---|---|
| 2012/0129247 A1* | 5/2012 | Tanoshima | G01N 35/00732 435/286.1 |
| 2012/0254723 A1* | 10/2012 | Kasa | G06F 40/226 715/234 |
| 2012/0254826 A1* | 10/2012 | Ganesh | G06F 11/3672 717/101 |
| 2013/0283157 A1* | 10/2013 | Ebata | G06F 40/53 715/265 |
| 2013/0332815 A1* | 12/2013 | Gallo | G09B 21/003 715/234 |
| 2014/0058733 A1* | 2/2014 | Voorhees | G06F 3/04847 704/260 |
| 2014/0180846 A1* | 6/2014 | Meron | G06F 40/143 715/234 |
| 2015/0007221 A1* | 1/2015 | Bhogal | H04N 21/25883 725/35 |
| 2015/0140526 A1* | 5/2015 | Marino | G09B 7/00 434/353 |
| 2015/0169545 A1* | 6/2015 | Eisen | G06F 40/30 704/9 |
| 2015/0338917 A1* | 11/2015 | Steiner | H04L 9/3271 345/156 |
| 2016/0247110 A1* | 8/2016 | Sinha | G06Q 10/06316 |
| 2017/0365083 A1* | 12/2017 | Hartrell | G06F 18/214 |
| 2018/0053498 A1* | 2/2018 | Kraft | G06F 40/166 |
| 2019/0018937 A1* | 1/2019 | Jadhav | G06N 20/00 |
| 2019/0042668 A1* | 2/2019 | Jadhav | G09B 19/0053 |
| 2019/0079855 A1* | 3/2019 | Dewitt | G06F 8/70 |
| 2019/0138598 A1* | 5/2019 | Albouyeh | G09B 21/006 |
| 2019/0236137 A1* | 8/2019 | Hesketh | G06F 16/9535 |
| 2020/0272432 A1* | 8/2020 | Shaikh | G06N 3/08 |
| 2020/0314346 A1* | 10/2020 | Mukul | G06V 30/414 |
| 2020/0335081 A1* | 10/2020 | Caffrey | H04L 51/046 |
| 2020/0372204 A1* | 11/2020 | Bradley | G06F 40/186 |
| 2020/0372205 A1* | 11/2020 | Bradley | G06F 40/103 |
| 2020/0396314 A1* | 12/2020 | Moon | G06F 16/9566 |
| 2020/0398999 A1* | 12/2020 | Ortiz | G07C 9/00309 |
| 2021/0081165 A1* | 3/2021 | Deshmukh | G06N 20/00 |
| 2021/0182355 A1* | 6/2021 | Wiley | G10L 13/00 |
| 2021/0360149 A1* | 11/2021 | Mukul | G06F 3/165 |
| 2022/0129123 A1* | 4/2022 | Nair | G06F 8/38 |
| 2022/0382565 A1* | 12/2022 | Sunkara | G06N 3/084 |
| 2023/0029752 A1* | 2/2023 | Szuchmacher | G06F 40/151 |
| 2023/0161946 A1* | 5/2023 | Bradley | G06F 16/22 715/205 |
| 2023/0178065 A1* | 6/2023 | Murugesan | G10L 21/0208 704/260 |
| 2023/0336532 A1* | 10/2023 | Barmpalios | H04L 63/0407 |

* cited by examiner

EVALUATING SCREEN CONTENT FOR ACCESSIBILITY

BACKGROUND

In computing environments, visual content, such as information on websites, can be presented in a manner that ensures access by users with disabilities. Various accessibility regulations and standards are applicable to website content. As an example, the Americans with Disabilities Act (ADA) prohibits discrimination on the basis of disability in public accommodation places. As another example, the Web Content Accessibility Guidelines (WCAG) provide standards for accessibility of web content, websites, and web applications for people with various disabilities.

BRIEF DESCRIPTION OF THE DRAWINGS

Examples of the disclosure will be rendered by reference to specific examples which are illustrated in the appended drawings. The disclosure is illustrated by way of example and not by way of limitation in the figures in which like reference numerals are used to refer to similar elements.

DETAILED DESCRIPTION

Figure 1:
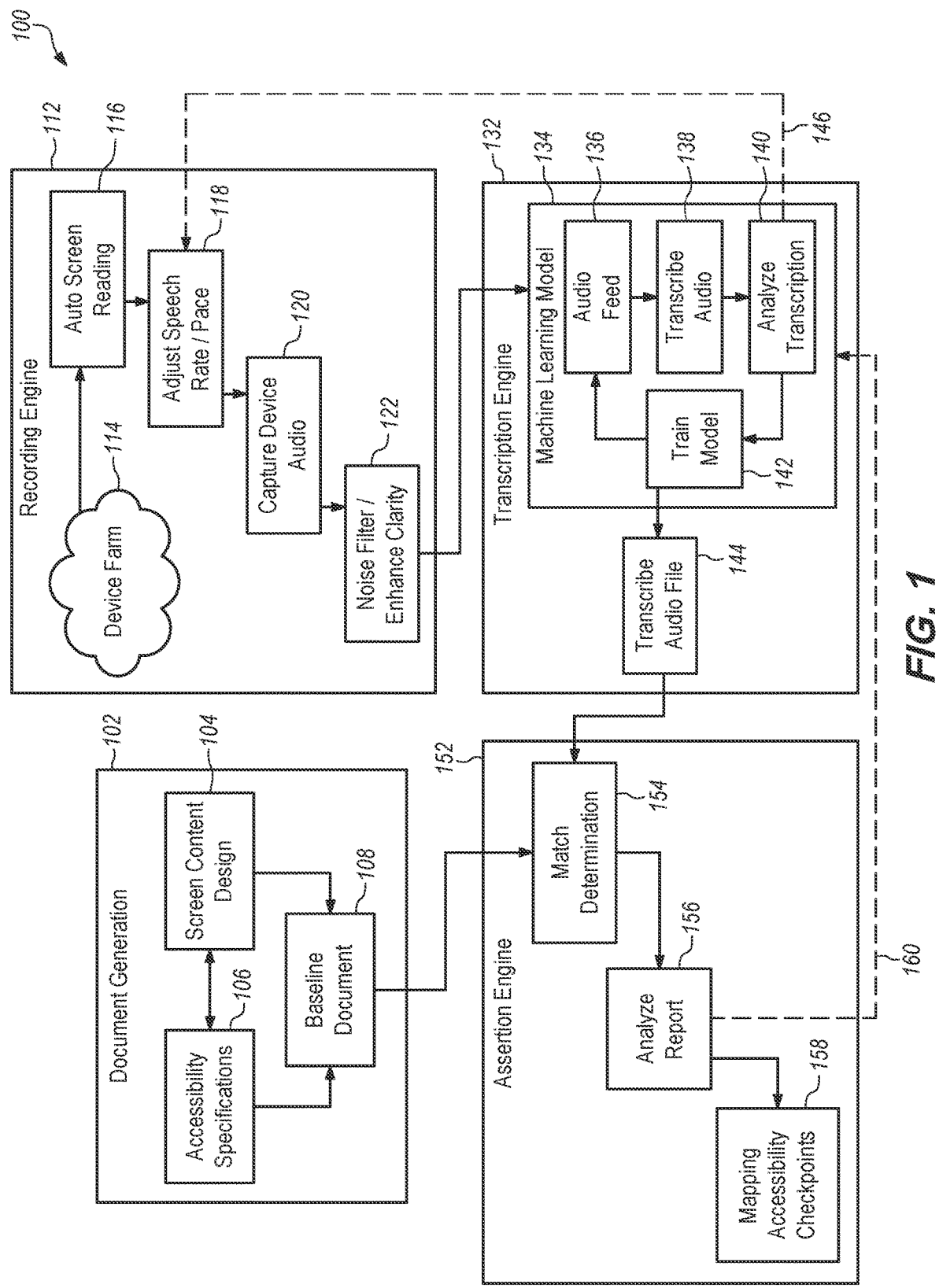
FIG. 1 illustrates an example screen readability evaluation system in accordance with some implementations of the present disclosure.

As accessibility standards and guidelines are changed and updated, evaluation procedures for various user devices, models and platforms may be revised, and websites may be retested for compliance. The validation process is often repeated until all defect fixes are validated. Such evaluation and reevaluation of a plethora of devices can be an arduous task to perform and may be costly and consume much time. When carrying out repetitive validations, the chance of defect seepage is increased.

The present disclosure provides evaluation of screen content accessibility as a comprehensive solution to promote screen content readability. According to some implementations of the present disclosure, a baseline document is provided having a script of expected screen content that conforms to one or more accessibility requirements. Actual screen content is tested on various user devices displaying the screen content.

For some implementations, the screen content is read by an assistive reading device (also referred to as a screen reader) and the resulting speech is captured. A machine learning model is then utilized to receive the audio file of the speech and to transcribe the audio file into an output transcription file. A determination is made as to whether the output transcription file and the baseline document are matched. Mismatches may be flagged as failures of the screen content to comply with accessibility requirements. An output report may be generated based on whether a match exists between the output transcription file and the baseline document.

For some examples, a website builder creates code to produce webpage(s) that reflect web content designs. Glitches with the code and/or content design can result in inaccurate reading by a screen reader. The present disclosure enables detection of such defects early in the life cycle of development. Evaluation procedures may ensure that screen content can be accurately read by screen readers to reflect an intended design of the screen content.

Evaluation of screen content accessibility of the present disclosure can be employed to simultaneously evaluate multiple user devices displaying the screen content and may employ a variety of screen reader technologies. Simultaneous evaluation refers to evaluating two or more different user devices of various configurations and/or types at the same general time. For example, multiple device evaluation methods may be initiated at a same time and run at slightly different paces or otherwise take different lengths of time to complete. In some implementations, simultaneous evaluation of different devices may be completed in substantially close periods of time.

In this manner, the present evaluation system is efficient and reduces the time taken to validate the ADA functionality on different devices. Simultaneous evaluation of multiple variations of user devices offers the benefit of saved time and resources. Evaluation execution time can be decreased by, for example, at least about 70% when the evaluations are executed simultaneously across multiple device types/device models/device platforms/platform versions.

For illustration purposes, manual type of evaluation of screen content that may take 10 minutes to complete for a single device and 1 minute to complete through the streamlined process of the present evaluation system for the single device, may also take, for example, only about 1 to 2 minutes to simultaneously evaluate multiple different user devices.

For some examples, reevaluation of a screen may be desired, for example, when some screen elements are revised. In such cases, the reevaluation system may access prior evaluation records to narrowly focus on revised portions of the screen content. For example, the evaluation system may be configured to retest only the revised portions of the screen content and the flow of the screen (for example how the revised screen elements integrate with the previously tested screen elements) rather than retest every screen element that had already passed evaluation system steps.

The comprehensive and automated screen readability evaluation system streamlines the screen content evaluation processes in a manner that saves time and resources and may also permit rapid, focused reevaluation of screens. Other benefits of the present screen readability evaluation system will be apparent from the further description of the system as described below.

FIG. 1 illustrates a screen readability evaluation system 100 to evaluate screen content accessibility according to an example of the present disclosure. The screen readability evaluation system 100 may utilize a screen reader to convert screen content to speech. The speech is transcribed and matched with design documentation that supports accessibility.

In one implementation, the evaluation system 100 utilizes a machine learning model to transcribe the speech and adjust parameters for speech reading to predict, adapt and improve transcription output. Where a particular aspect of the transcription and the baseline document are determined not to match, the speech content feature associated with the aspect may be flagged as failing to comply with a related accessibility requirement.

As shown in FIG. 1, among other components, the screen readability evaluation system 100 includes: (1) a document generation 102, (2) a recording engine 112, (3) a transcription engine 132, and (4) an assertion engine 152. Other architectures are also possible for using the present screen readability evaluation system.

At document generation 102, a screen content design 104 is created with reference to accessibility specifications 106 such that the design is consistent with user accessibility requirements. The screen content design 104 may itself be created by a content designer (not shown) using a computing device. The content designer may consider ways in which a user consumes content to prepare the screen content design 104. For example, the screen content design 104 may include a particular flow of a webpage or groups of webpages, meaning of symbols, effect of images (e.g., photographs and graphics), commands and links to navigate the content, fields to be filled out, as well as clarity of text.

In one example, the web content is designed to enable accessibility by people with disabilities, conditions, or diagnoses that may otherwise hinder consumption of visual content. The design may comply with accessibility specifications 106 such as WCAG specifications or other accessibility specifications specified by organizations, companies, or institutions.

In an implementation, elements of a page may be designed to meet standards to be perceivable, operable, understandable, and robust. In this manner, the present disclosure is consistent with accessibility mandates such as under the ADA. The accessibility specifications 106 may, at least in part, dictate specific aspects of the speech content that are tested.

The screen content design 104 may include visible and invisible elements of a screen including alt-text, fonts, standard HTML tags, headings, landmarks, skip links, and other features to promote readability by an assistive reader. A baseline document 108 is generated that includes the expected screen content design 104 tailored to promote accessibility according to accessibility requirements 106. In some implementations, different versions of the baseline document may be generated based on various attributes of the particular computing device showing the screen content. For example, a different baseline document may be used for web and mobile platforms, mobile operating systems, various device manufacturers and device models, etc., all based on similar screen content adapted for the particular device.

In FIG. 1, the baseline document 108 includes a script of the expected recitation of a reading of the screen content by a screen reader. The baseline document 108 may include both visible and non-visible elements that are accessible to the screen reader which may be scripted to be read according to a pre-defined flow.

The terms "screen", "screen content", "display", "graphical user interface" (GUI), and "website", as used in this description refer to any software-generated depiction presented on a display. Elements on screens may include text, buttons (such as links), images (such as graphics and photographs), fields, etc. Screen content includes aspects of both visual elements that may be observed by a user of a display and non-visual elements. Non-visual elements of the screen content, such as alt-text and tags, may be hidden from view on a display and still be accessible to an assistive reader.

In FIG. 1, the recording engine 112 uses one or more user devices to display web content created by a developer. In some implementations, various user devices may be tested including different device types that include certain characteristics including models, platforms and platform versions such as operating systems, and the like.

User device hardware types may include, without limitation, personal computers, notebooks, mobile devices, etc. In some implementations, the recording engine may access a device farm 114 over one or more networks to test different user devices. In some implementations, the recording engine may receive a user selection of one or more user devices for evaluation from a menu of user devices available through the device farm 114.

Numerous user devices may be selected for evaluation by the screen readability evaluation system 100, resulting in time and resource savings. For example, when an operating system update is rolled out to multiple device types, the screen readability evaluation system may test all of the devices having the updated software at the same or substantially the same time.

In some implementations, a device identifier, such as a device serial number, may be entered into the screen readability evaluation system 100. The evaluation system 100 may access a stored database of device identifiers matched with device types and device characteristics. The results of the evaluation system 100 may be stored for the device identifier and associated information, such as dates and times of evaluation, identified failures and passes, scores reflecting types and number of failures and passes, number of times tested before achieving full passing scores, etc.

For the purposes of the present discussion, a "screen reader" or "assistive reader" refers to any software program or hardware that uses a text-to-speech engine to convert on-screen information, such as web content, into audio, such as speech, which can be heard through various hardware devices, e.g., speakers, or headphones. The term "screen reader" is not intended to specify a particular product for a specific operating system and/or devices. The terms "screen reader" and "assistive reader" are employed interchangeably in this description.

In some implementations, the evaluation system 100 may implement an auto screen reading module 116 to automatically screen read one or more screens from device farm 114. For example, in such implementations, the screen reader performs, without user direction, reading of the screen where the assistive reader is not directly controlled by user interaction with the screen content and navigation of the screen reading.

User interaction may refer to a user employing a peripheral control, e.g., a keyboard or voice control for selection. A mode of navigation may be dictated by the evaluation system 100, rather than by user input, e.g., headings read, line-by-line read, landmarks, top to bottom, etc. The evaluation system 100 provides stored instructions to the assistive reader in pre-defined navigation paths through certain elements in a particular order of one or more screens. Also, screen interactions are provided by the evaluation system.

Evaluation of multiple screens through activation of elements, e.g., links, may be performed automatically by the evaluation system to navigate to a subsequent screen for evaluation. In this manner, the evaluation system 100 evaluates pre-defined aspects of the speech to identify errors such as particular elements skipped or misread by the assistive reader or if a flow of reading is not performed in the intended manner.

In FIG. 1, audio speech from the auto screen reading module 116 is received by the adjust speech rate/pace module 118, which may vary the parameters to optimize transcription of the speech. For example, the recording engine 112 may control speech rate (also referred to as "pace"), such as 120 to 150 words per minute. The recording engine 112 uses a capture device audio module 120 to capture the speech and generate an audio file. The audio is inspected by the recording engine 112, and applies a noise filter/enhance clarity module 122 to enhance parameters, which may be adjusted to prepare the speech for transcription by the transcription engine 132.

As shown in FIG. 1, the transcription engine 132 may include a machine learning model 134 that receives audio feed 136 of the audio file produced by the recording engine 112. The machine learning model 134 uses a transcribe audio module 138 to transcribe the audio feed 136. In some implementations, the machine learning model 134 may use natural language processing (NLP) to transcribe the audio into a preliminary transcription file that is fed into an analyze transcription module 140.

Analysis of the preliminary transcription file is performed by the machine learning model 134 to make decisions on whether there are inaccuracies in the transcription. Where the machine learning model 134 determines, through the analysis, that the speech in the audio file does not meet a threshold for accuracy, due to issues with the recording of the audio, the machine learning model 134 uses a feedback loop 146 to provide refinement instructions to the recording engine 112 to adjust recording parameters.

Thus, a first output of the machine learning model is refinement information to improve recording of speech. The recording engine 112 may re-record the audio with the updated recording parameters, and a transcribe audio file module 144 is used to transcribe the audio file, in some examples, with use of transcription data by the machine learning model as described herein. Thus, a second output of the machine learning model may be the transcription data that is determined by the machine learning model to be more representative of the speech from a screen reader of screen content.

The machine learning model may be trained with training data that may include particular terminology specific to the owner (e.g., company, institution, organization, department) of the web content and/or for a particular field or industry. For example, financial institutions may readily recognize specific banking terms, or healthcare establishments may recognize certain medical terms, and the machine learning model may be trained to also recognize such terms which may not otherwise be readily recognizable.

The machine learning model may be trained and retrained by iterative optimization where the machine learning model is retrained with feedback information and improved in its determination of transcription accuracy. As described below, the machine learning model may be retrained with pass/fail feedback data from the assertion engine 152.

Passing screen content infers that the output transcription is accurate, and the resulting training data based on the passing screen content may be labeled as valid for subsequent determinations by the machine learning model. A failed screen content transcription may be construed as an erroneous transcription and the associated data may be labeled as possibly invalid. When it is determined that failure of the screen content is due to an erroneous baseline document or otherwise associated with the coding of the screen content, the appropriate remedial actions are taken not including retraining of the machine learning model. When it is determined that the error is associated with the machine learning model, for example failure occurs at a same point for multiple different device models, operating systems, etc., the machine learning model undergoes retraining to address the problem.

A train model module 142 may receive the transcription files to train and retrain the machine learning model 134 to enable greater accuracy and reliability of the output transcription file. For example, the present disclosure may employ a supervised learning algorithm that generates a mathematical model of a set of data points or training data. The training data may itself include known inputs and the desired outputs. For example, the training data may include screen content with known specific terms (e.g., financial terms, known visual and non-visual content and their associated outputs) and corresponding outputs (i.e., the supervisory signals for a corresponding input).

The training example input and output form a vector array or matrix, and through iterative optimization of the function represented by the matrix, the machine learning model of the present disclosure can predict the output associated with new inputs resulting in the machine learning model improving accuracy of its outputs or predictions over time.

As shown in FIG. 1, an assertion engine 152 uses a match determination module 154 to receive the baseline document 108. Match determination 154 is also used to receive the output transcription file from the transcribe audio file module 144 of the transcription engine 132. The assertion engine 152 is to determine a match between aspects of the baseline document 108 and the output transcription file from the transcribe audio file module 144.

For example, particular steps of the evaluation may involve scrutinizing particular aspects of the screen content that further compliance with accessibility requirements such as reading content in a particular order, skipping of screen elements, adding or deleting lines, etc. The evaluation may be performed for one or more scenarios.

The assertion engine 152 uses an analyze report module 156 to generate an analysis report 156 with results of the match determination module 154 to determine failure and/or pass of aspects of the screen content. In some implementations, the analysis report 156 may be fed as feedback 160 into the machine learning model 134 for retraining the machine learning model 134.

The assertion engine 152 may further use a mapping accessibility checkpoints module 158 to map the analysis report to specify any found failures in which one or more accessibility checkpoints are not met, and any determined passes for successful builds that satisfy the accessibility checkpoints. Examples of failures may include, for example, incorrect spelling of text on the screen, wrong sequence of reading the screen, a skipped line of the screen, etc.

Figure 2A:
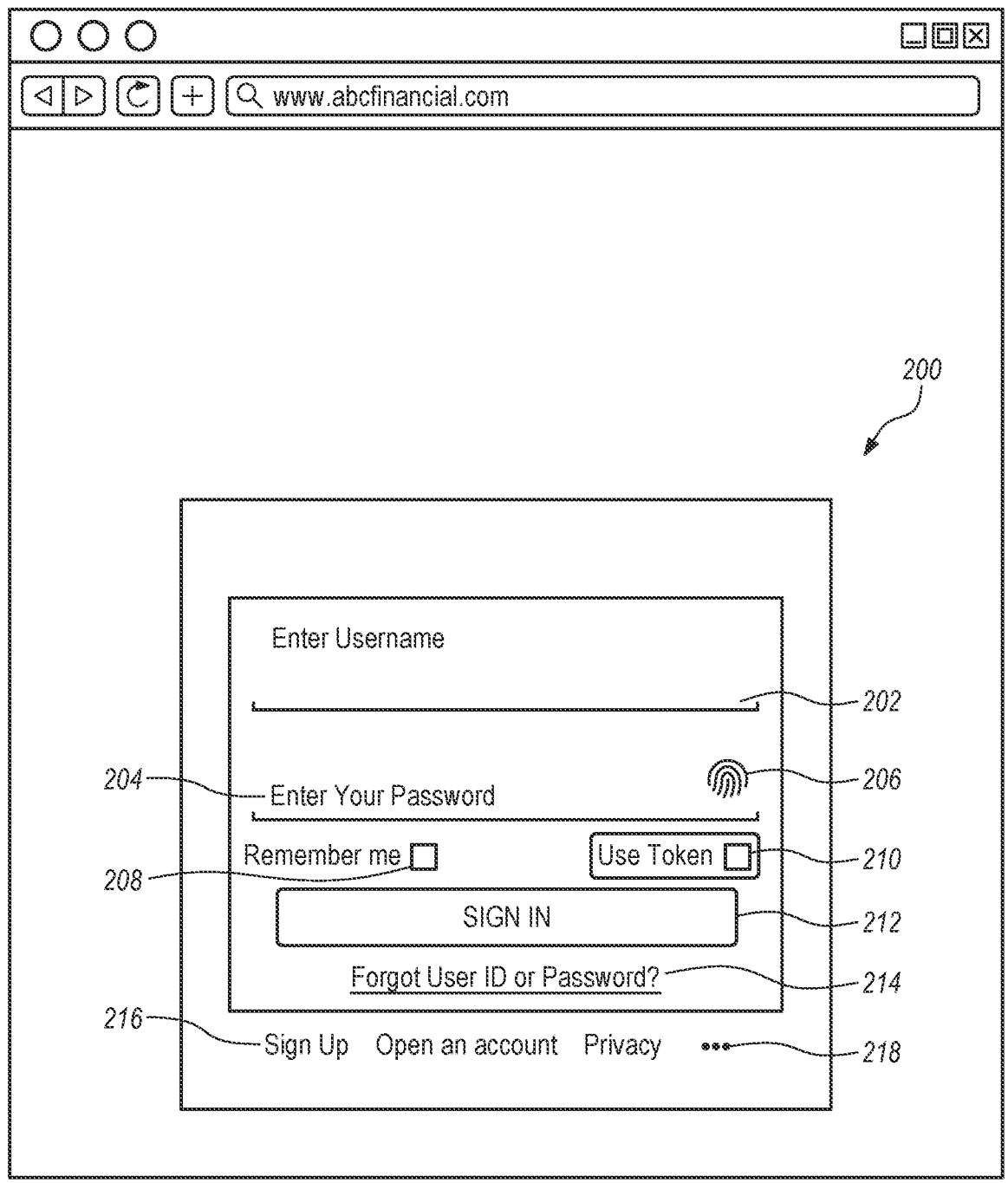
FIG. 2a illustrates an example of a login screen in accordance with some implementations of the present disclosure.
Figure 2B:
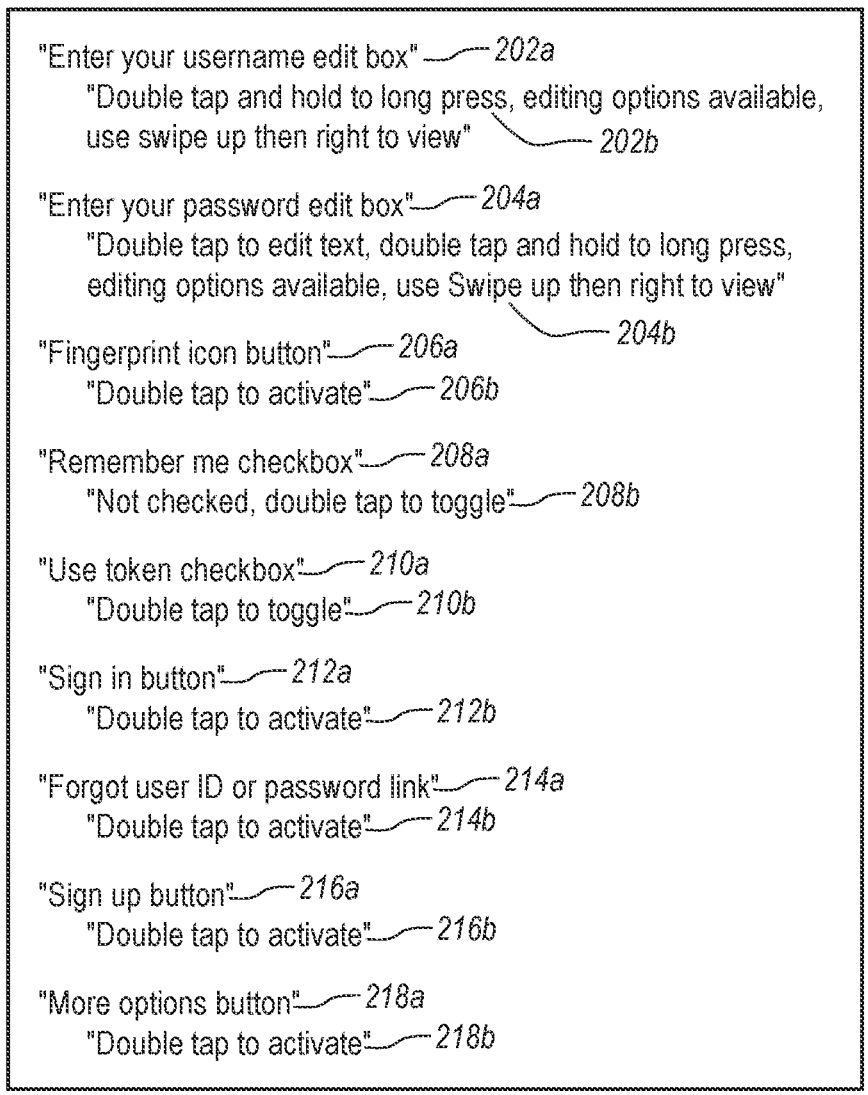
FIG. 2b is an example of a document produced in evaluating the login screen of FIG. 2a according to some implementations of the present disclosure.

FIG. 2a shows a display of a login screen 200 according to an example of the present disclosure. FIG. 2b shows an example baseline document 230 associated with the login screen 200. The baseline document 230 is a transcription of audio of a reading of the visible elements (e.g., text boxes) and nonvisible elements that are input commands or actions that a disabled person must take to use, manipulate or activate a corresponding visible element. As each element of the login screen 200 is navigated, the reader reads the element and the corresponding actions or commands for manipulating or activating a corresponding element.

Here, the login screen 200 may include various types of visible elements, including text, edit boxes, check boxes, links, buttons, and the like, which are visibly provided on the login screen 200.

As shown in FIG. 2a, visible elements on the login screen 200 may include an "Enter Username" edit box 202 and an "Enter Your Password" edit box 204, for example. In FIG. 2b, the output transcription for the "Enter Username" edit box 202 is "Enter your username edit box" shown at 202a and the corresponding nonvisual command element is "Double tap and hold to long press, editing options available, use Swipe up the right to view" shown at 202b. The first portion of the output transcription "Enter your username edit box" shown at 202a is the name of the element edit box 202 and the second portion of the output transcription "Double tap and hold to long press, editing options available, use swipe up the right to view" shown at 202b is the command/action for a disabled user to take to use or activate the "Enter Username" edit box 202.

Similarly, in FIG. 2b, the output transcription for the "Enter Your Password" edit box 204 is "Enter your password edit box" as shown at 204a and the corresponding nonvisual command element is "Double tap to edit text, double tap and hold to long press, editing options available, use Swipe up the right to view" as shown at 204b.

Icons may be described in the baseline document 230, such as fingerprint icon 206 on the login screen 200, which corresponds to "Fingerprint icon button" 206a and "Double tap to activate" 206b in the baseline document 230. The login screen 200 may include a "Remember me" checkbox 208 associated with the baseline document 230 entry, "Remember me checkbox" at 208a and "Not checked, double tap to toggle" at 208b.

The login screen 200 further includes a "Use Token" checkbox 210 that is associated with an entry, "Use token checkbox" at 210a and "Double tap to toggle" at 210b of the baseline document 230. The login screen 200 further includes a "SIGN IN" box 212 that is associated with an entry, "Sign In button" at 212a and "Double tap to activate" at 212b, of the baseline document 230.

There is a link on the login screen 200 for a "Forgot User ID or Password?" 214 which is described as "Forgot user ID or password link" at 214a in the baseline document 230 and "Double tap to activate" at 214b. Also, on the login screen 200 is an option to "Sign Up" 216a which is read and transcribed as "Sign up button" at 216a in the baseline document 230 and "Double tap to activate" at 216b. Three dots 218a appearing on the login screen 200 are described as "More options button" 218a and "Double tap to activate" at 218b in the baseline document 230.

Figure 2C:
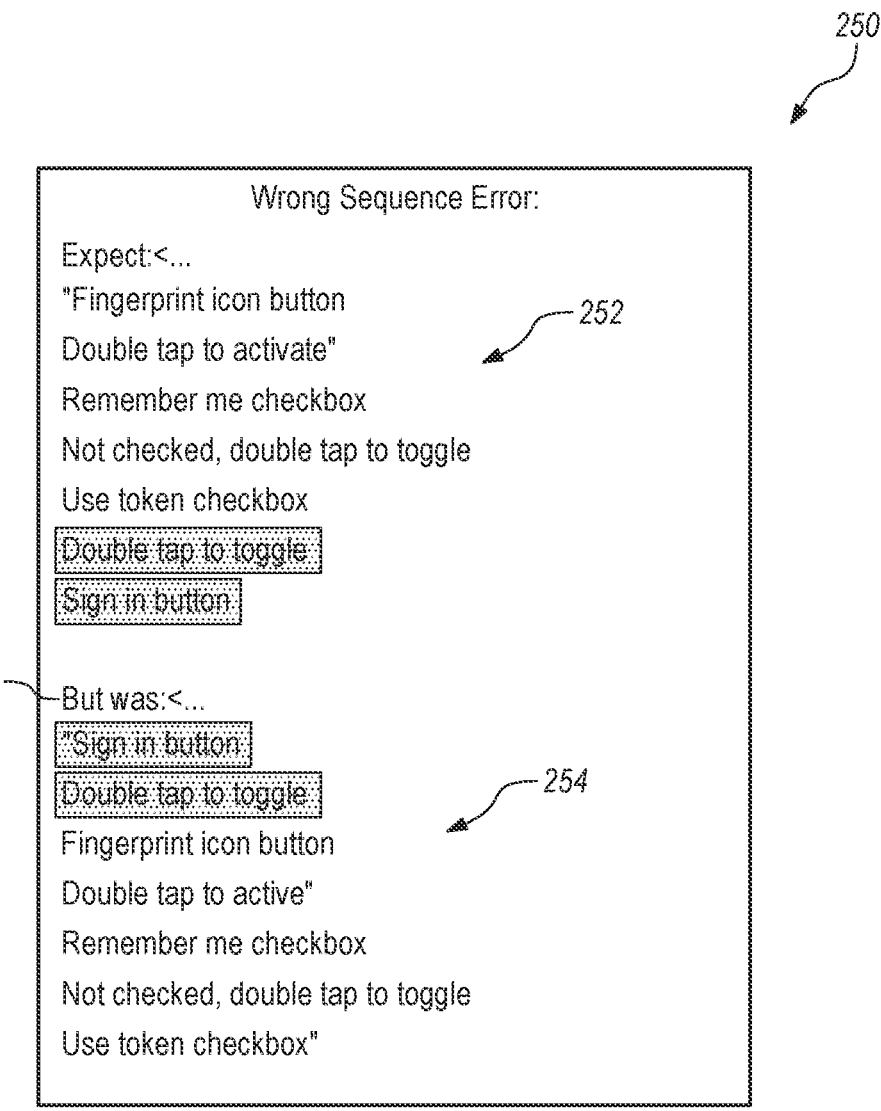
FIG. 2c is an example of match determination failures of an analysis report in accordance with some implementations.

FIG. 2c shows an example record for a wrong sequence error 250 based on a match determination failure in the analysis report 156 (FIG. 1). The analysis report 156 is from the screen readability evaluation of the login screen 200 of FIG. 2a.

Figure 2D:
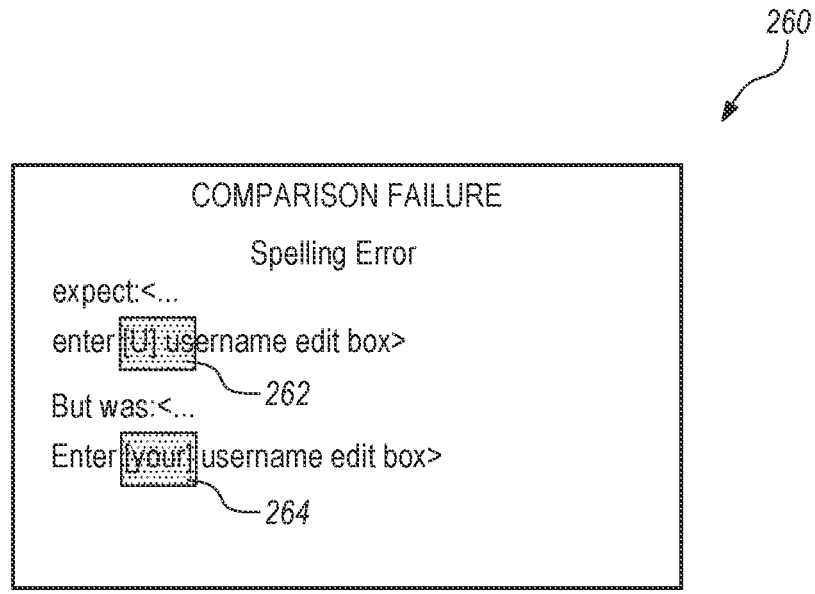
FIG. 2d is an example of match determination failures of an analysis report in accordance with some implementations.
Figure 2E:
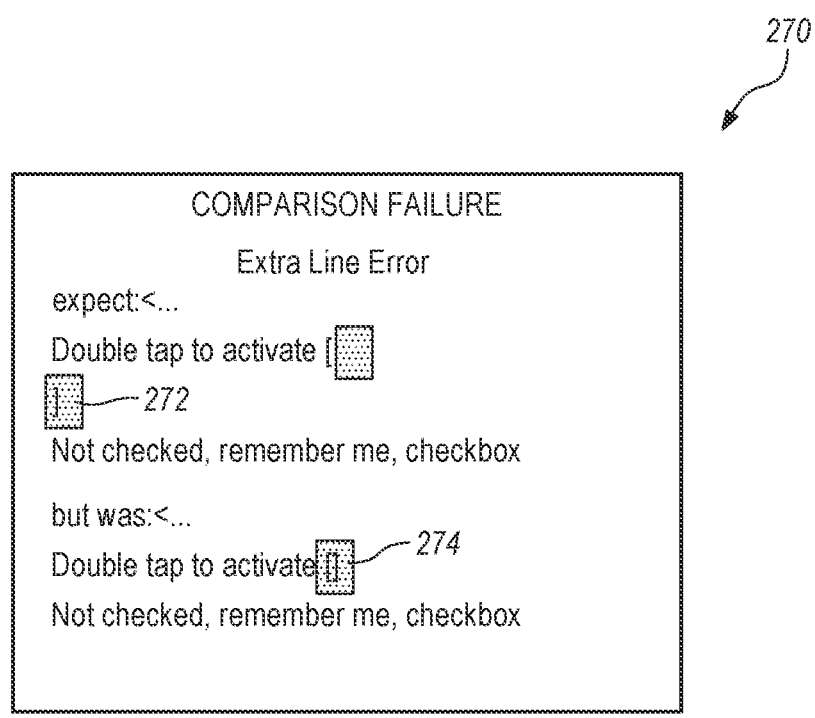
FIG. 2e is an example of match determination failures of an analysis report in accordance with some implementations.

FIG. 2d shows an example record for a spelling error 260 found in the analysis report 156 based on a match determination failure. FIG. 2e shows an example record for an extra line error 270 found in the analysis report 156 based on a match determination failure.

The analysis report 156 (FIG. 1) reflects a determination of matching of baseline document 108 (FIG. 1) with output transcription from transcribe audio file 144 (FIG. 1). The output transcription from transcribe audio file 144 contains the text that is expected to also be in the baseline document 108. When the baseline document 108 contains text descriptions that differ from or are inconsistent with the output transcription from transcribe audio file 144, an error is recognized by the evaluation system. The analysis report includes error observation language, such as, "but was" 251.

The baseline document 108 may represent a pre-defined order in which a screen reader is intended to proceed in reading elements of the screen. In a wrong sequence error 250 record, an error is determined if the sequence of text is inconsistent with that pre-defined order.

In FIG. 2c, the pre-defined order by evaluation system 100 as shown in baseline document 230 (FIG. 2b) and as shown at 252 recites:
Fingerprint icon button
Double tap to activate
Remember me checkbox
Not checked, double tap to toggle
Use token checkbox
Double tap to toggle"
However, as shown at 254 of FIG. 2c, the output transcription file recites:
"fingerprint icon button
Double tap to activate,
Remember me checkbox
Not checked, double tap to toggle
Use token checkbox
Double tap to toggle"
Since the order of the text, "sign in button, double tap to activate" is in a different place in the baseline document, the wrong sequence error is recognized.

In FIG. 2d, through determination of matching, a spelling error may also be found in the output transcription from transcribe audio file 144. In the spelling error report 260, a spelling error is described in which the output transcription from transcribe audio file 144 recites, "enter U username edit box" 262, but the baseline document 230 provides the text, "enter your username edit box" as shown at 264.

In FIG. 2e, the extra line error record 270 specifies an error in the output transcription from transcribe audio file 144 that reflects an extra blank line and recites: "Double tap to activate [ ] Remember me checkbox" 272 with an extra line between the terms, "activate" and "Remember me", whereas the baseline document 230 does not include an extra line between "activate" and "Remember me" 274.

Figure 3:
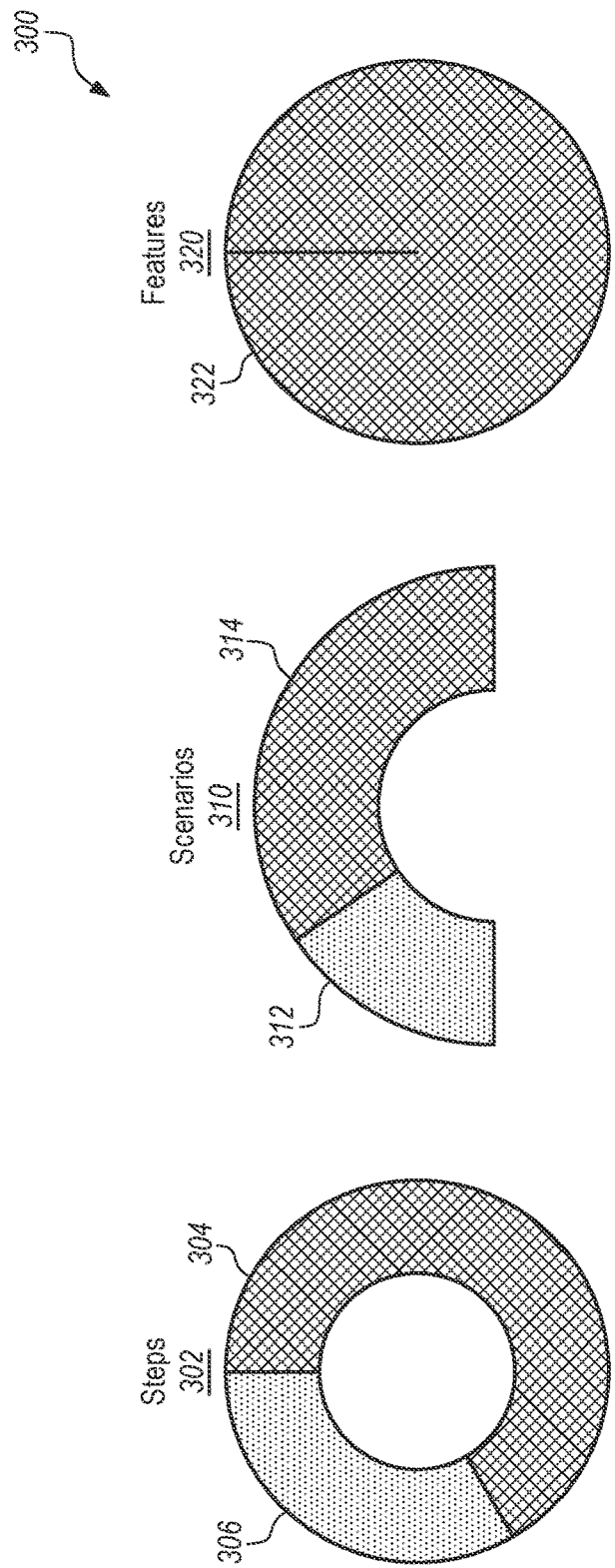
FIG. 3 illustrates an example of a summary report of screen content evaluation in accordance with some implementations.

FIG. 3 is an illustration of an example of an evaluation data output report 300 of evaluation results data that may be generated based on an analysis report 156 (FIG. 1). The evaluation data output 300 shows a data table 330 of steps data, scenario data, and feature data for given screen content of a particular user device. A steps graph diagram 302 shows steps data, a scenario graph diagram 310 depicts scenario data, and a feature pie chart graph 320 represents feature data.

The feature is a high-level description of the evaluation script that is executed. In the present example, a feature is an automatic navigation of a login screen such as the login screen of FIG. 2a and recording of audio of a reading of the elements. The feature graph diagram 320 shows the overall status of the evaluation as a failure. In the data table 330, the feature data further includes the duration time (1:31.846) of the evaluation.

Examples of steps may include "given", "when", and "then" components. For example, steps may include a given-step for the context of the text to be analyzed: I locate the actual transcription file, "login.txt". A then-step may include for an expected outcome: I verify actual transcription file "login.txt" matches expected ADA baseline file "login-expected-wrong-sequence.txt."

The steps graph diagram 302 shows percentage failure rate 304, e.g., 70%, and a percentage pass rate 306, e.g., 30% of a total number of steps tested, e.g., 10 steps. The data table 330 may also provide data for any skipped, pending, or undefined steps.

The scenario data describe the steps and the expected outcome as presented by the baseline document. For example, a scenario outcome may be defined as: User describes ADA audio recording and verifies the actual audio transcription against expected ADA test file. In the example shown in FIG. 3, the scenario data include 4 scenarios tested, in which 3 had failed and 1 had passed. The graph diagram 310 shows scenario passes 312 of 25% and scenario failures 314 of 75%. Other types of graphs may be employed to depict test data in a test summary report.

Figure 4:
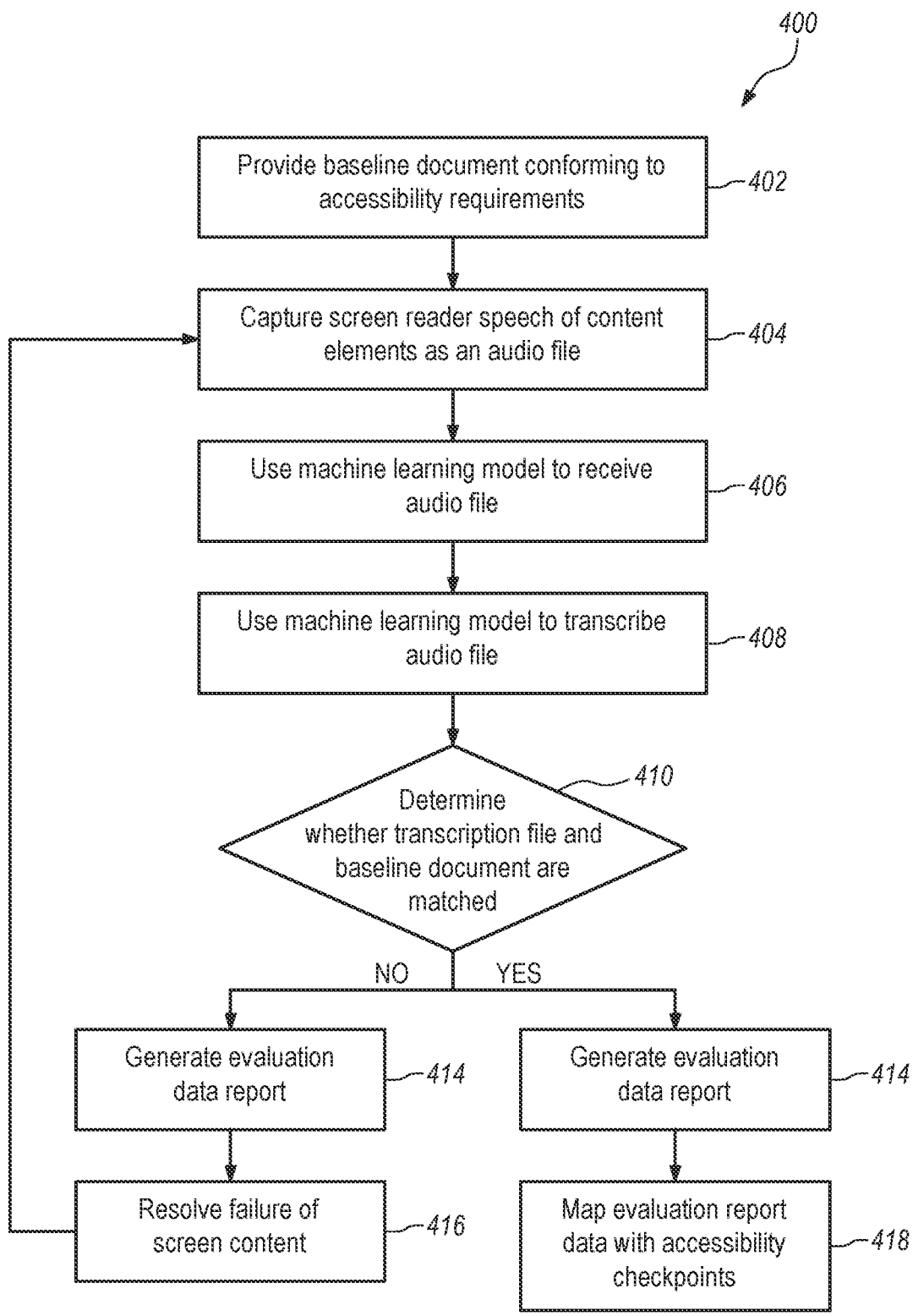
FIG. 4 illustrates an example process to evaluate screen content for accessibility in accordance with some implementations.

FIG. 4 is a flow diagram of an example process to evaluate screen content for accessibility. In some implementations, a screen reader device may be utilized for the screen content evaluation.

In block 402, a baseline document is provided. The baseline document includes a script of expected screen content that is designed to conform to accessibility requirements such as WCAG. The baseline document may test screen content on particular user devices for readability (e.g., by a screen reader that complies with the accessibility requirements).

In block 404, the speech from the screen reader reading of the screen content is captured as a generated audio file. The recording parameters of the audio file may be adjusted to assist in transcription of the audio. For example, adjustments may be made to speech rate, pace, noise filtering, and clarity.

In block 406, the present method employs a machine learning model, that, uses the machine model to receive the audio file. In block 408, uses the machine learning model to transcribe the audio file, analyzes the transcription for accuracy, and provides refinement information to adjust the recording parameters and enhance the audio file for improved transcription. Once the transcription meets an accuracy threshold, the machine learning model outputs the transcription file.

In decision block 410, it is determined whether the transcription file and the baseline document are matched and the results are embodied in a generated evaluation data output report in block 414.

In some implementations, certain mismatches may be acceptable as not creating a failure of the screen content if the errors can still satisfy accessibility requirements. For example, some errors may be considered benign and acceptable. In some implementations the number of determined errors may be acceptable below a failure threshold.

If the output transcription file and the baseline document are matched to an acceptable level (e.g., 90% match, 100% match), the screen content may be considered accepted. If the transcription and the baseline document do not match, the screen content failure(s) is/are acted upon to attempt to achieve resolution of the failures. In some implementations, any determined mismatches result in a failure of the screen content and call for correction. In such implementations, 100% matching results in an overall passing status of the screen content.

In some implementations, the failure information may be provided as feedback to the machine learning model to improve the transcription process in block 408. The process returns back to block 404 for the screen reader to read the updated screen content and capture the speech in an audio file. The process repeats to attempt to achieve sufficient passes to accept the screen content as satisfying accessibility requirements.

In some implementations, the data from a passing evaluation data output report is mapped with accessibility checkpoints in block 418. The mapped checkpoints provide support for the compliance of the screen content with accessibility requirements.

Methods described herein, e.g., with reference to FIG. 4, can be implemented by computer program instructions or code which can be executed on one or more processors (e.g., microprocessors or other processing circuitry) and can be stored on a computer program product including a non-transitory computer readable medium (e.g., storage medium). Alternatively, one or more methods can be implemented in hardware (logic gates, etc.), or in a combination of hardware and software.

Figure 5:
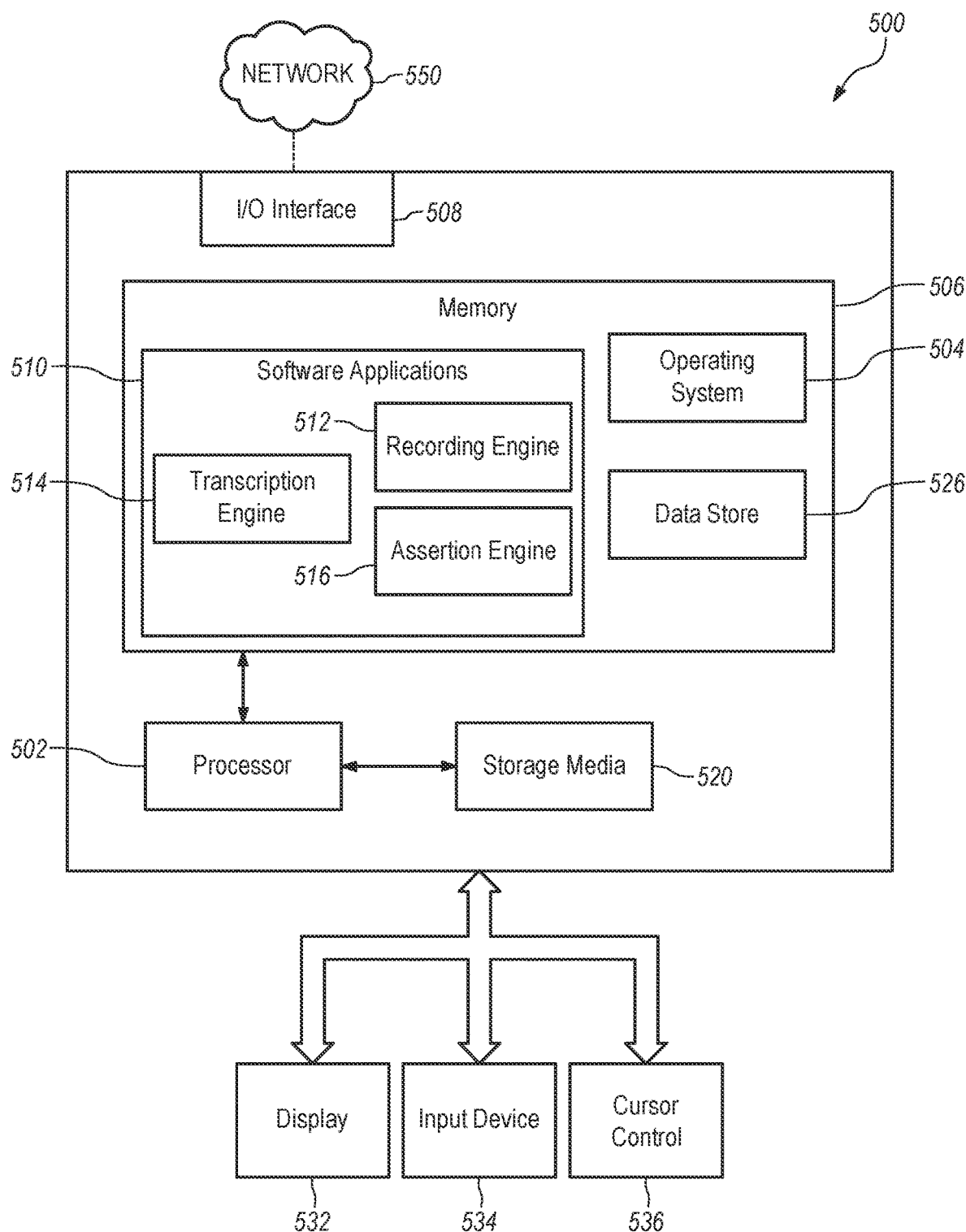
FIG. 5 illustrates an example of a computing device to implement the screen readability evaluation system of FIG. 1 in accordance with some implementations of the present disclosure.

FIG. 5 is a block diagram of a computing device usable to implement one or more components of the screen readability evaluation system 100 of FIG. 1. Computing device 500 may include familiar computer components such as a processor 502, and memory storage devices, such as a memory 502, e.g., random access memory (RAM), storage media 520, and an input/output (I/O) interface 508. In some implementations, computing device 500 may be a server.

Computing device 500 also includes a software application 510, which may be stored on memory 506 or on any other suitable storage location or computer-readable medium. Software application 510 provides instructions that enable processor 502 to perform the functions described herein and other functions. The components of computing device 500 may be implemented by one or more processors or any combination of hardware devices, as well as any combination of hardware, software, firmware, etc.

Software applications may include one or more of a recording engine 512 (for example, recording engine 112 of FIG. 1), include transcription engine 514 (for example, transcription engine 132 of FIG. 1), or an assertion engine 516 (for example, assertion engine 152 of FIG. 1). The recording engine 512 records and converts speech of the screen to an audio file. The transcription engine 514 may include the machine learning model 134 of FIG. 1.

In some implementations, the machine learning model may be trained by an independent computer device (not shown) in communication with computing device 500, such as via network 550 through interface 508, in which case feedback information may also be provided to the independent computer device for retraining of the machine learning model. The assertion engine 516 compares files/documents and determines failures and/or passes of the screen content code.

Software applications may also be referred to as programs, computer programs, software, or code, may also contain instructions that, when executed, perform one or more methods, such as those described herein. The computer program may be tangibly embodied in an information carrier such as computer or machine readable medium, for example, memory 506, storage media 520, or memory on processor 502. A machine-readable medium is any computer program product, apparatus or device used to provide machine instructions or data to a programmable processor.

Computing device 500 further includes operating system 504. Any operating system 504, e.g., server OS, that is supports the evaluation system process performed by the computing device 500 may be employed.

In some implementations, the I/O interface 508 (which may represent a combination of a variety of communication interfaces) may include a network interface such as an Ethernet card, digital subscriber line (DSL) unit, etc. In some implementations, the I/O interface may be employed to communicate evaluation reports, mapping evaluation results to checkpoints, analysis reports, and other evaluation data to other computing devices, storage devices, servers, etc., such as for government enforcement agencies, legal services entities, internal company compliance departments, etc.

Memory 506 and data store 526 are examples of tangible non-transitory computer readable media for storage of data, audio/video files, computer programs, and the like. The computing device 500 may be coupled via a bus to a display 532, such as a computer monitor, for displaying information, such as screen content, evaluation data output reports, baseline documents, audio file transcriptions, results of mapping report data to checkpoints, etc., to a computer user. An input device 514 is used to enter user selections. In some implementations, the computing device 500 is fully automated to conduct the screen readability evaluation processes and user input devices are not required. In such implementations, user input may be received to direct the computing device 500 to perform actions on the resulting evaluation data output reports, such as custom formatting reports and sending the reports to other computer devices.

Particular implementations may be implemented in a non-transitory processor-readable storage device for use by or in connection with the instruction execution system, apparatus, system, computer, or device. Particular implementations may be implemented by using application specific integrated circuits, programmable logic devices, etc.

A "processor" includes any suitable hardware and/or software system, mechanism or component that processes data, signals or other information. Any suitable programming language can be used to implement the routines of particular examples including C, C++, Java, JavaScript, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Note that the processes conducted by the evaluation system 100 described in FIG. 1 may be performed by one or more modules within the respective components/engines. Methods described herein can be implemented by computer program instructions or code, which can be executed on one or more computers. In some implementations, the code can be implemented by one or more digital processors (e.g., microprocessors or other processing circuitry) and can be stored on a computer program product including a non-transitory computer readable medium (e.g., storage medium), such as a magnetic, optical, electromagnetic.

While the above is a complete description of specific examples of the disclosure, additional examples are also possible. Thus, the above description should not be taken as limiting the scope of the disclosure, which is defined by the appended claims along with their full scope of equivalents.

The invention claimed is:

1. An apparatus for evaluating screen content for accessibility with a screen reader device, the apparatus comprising:
one or more processors; and
logic encoded in one or more non-transitory computer-readable storage medium for execution by the one or more processors and when executed operable to perform operations comprising:
receiving a baseline document including a script of expected screen content conformed to one or more accessibility requirements;
evaluating screen content of one or more user devices displaying the screen content by:
generating an audio file based on speech derived from the screen reader device in reading screen content elements;
receiving, by a machine learning model, the audio file;
transcribing, by the machine learning model, the audio file into a preliminary output transcription file;
ascertaining, by the machine learning model, whether the preliminary output transcription file associated with the audio file meets or is below an accuracy threshold;
upon the ascertaining that the preliminary output transcription file is below the accuracy threshold, the machine learning model:
evaluates the audio file to determine a refinement metric for the generating the audio file;
adjusts one or more parameters for the generating the audio file according to the refinement metric, wherein the adjusts one or more parameters include one or more of changing a speech rate, altering a speech pace, filtering noise, or enhancing clarity of the audio file; and
repeats the generating the audio file based on the adjusted one or more parameters until the accuracy threshold is met;
upon the ascertaining that the preliminary output transcription file meets the accuracy threshold, the machine learning model generates an output transcription file;
determining whether the output transcription file matches the baseline document; and
generating an evaluation data output report of the screen content for accessibility based on the determining whether the output transcription file matches the baseline document.

2. The apparatus of claim 1, wherein the one or more user devices include a plurality of user devices of one or more different types, models, platforms, or platform versions, and wherein evaluation of the screen content is performed simultaneously for the plurality of user devices.

3. The apparatus of claim 1, wherein the operations further comprise:
training the machine learning model via a training module implementing a supervised learning algorithm with training transcription data content comprising ground truth input with known specific terms and corresponding outputs; and training the machine learning in an iterative manner with feedback data.

4. The apparatus of claim 1, wherein the transcribing by the machine learning model is performed using natural language processing.

5. The apparatus of claim 1, wherein the operations further comprise:
determining at least one failure of the output transcription file to match the baseline document based on determining whether the output transcription file and the baseline document are matched; and
providing feedback of the at least one failure for training of the machine learning model.

6. The apparatus of claim 1, wherein the operations further comprise:
analyzing the evaluation data output report;
mapping the evaluation data output report with a list of accessibility checkpoints; and
generating a checkpoint satisfaction report specifying checkpoints that are satisfied.

7. The apparatus of claim 1, wherein the baseline document includes a pre-defined order for reading the screen content elements, the operations further comprising:
determining, based on comparing the output transcription file to the baseline document, a sequence error in a sequence of text that represents an order in which the screen reader reads the screen content elements, wherein the sequence of text fails to match with the pre-defined order specified by the baseline document.

8. A method for evaluating screen content for accessibility with a screen reader device, the method comprising:
receiving a baseline document including a script of expected screen content conformed to one or more accessibility requirements;
generating an audio file based on speech derived from the screen reader device in reading screen content elements;
receiving, by a machine learning model, the audio file;
transcribing, by the machine learning model, the audio file into a preliminary output transcription file;
ascertaining, by the machine learning model, whether the preliminary output transcription file associated with the audio file meets or is below an accuracy threshold;
upon the ascertaining that the preliminary output transcription file is below the accuracy threshold, the machine learning model:
evaluates the audio file to determine a refinement metric for the generating the audio file;
adjusts one or more parameters for the generating the audio file according to the refinement metric, wherein the adjusts one or more parameters include one or more of changing a speech rate, altering a speech pace, filtering noise, or enhancing clarity of the audio file; and
repeats the generating the audio file based on the adjusted one or more parameters until the accuracy threshold is met;
upon the ascertaining that the preliminary output transcription file meets the accuracy threshold, the machine learning model generates an output transcription file;
determining whether the output transcription file matches the baseline document; and
generating an evaluation data output report of the screen content for accessibility based on a comparison of the output transcription file to the baseline document.

9. The method of claim 8, wherein the one or more user devices include a plurality of user devices of one or more different types, models, platforms, or platform versions, and wherein the evaluation of the screen content is performed simultaneously for the plurality of user devices.

10. The method of claim 8, wherein the method further comprises:
training the machine learning model via a training module implementing a supervised learning algorithm with training transcription data content comprising ground truth input with known specific terms and corresponding outputs; and
training the machine learning in an iterative manner with feedback data.

11. The method of claim 8, wherein the transcribing by the machine learning model is performed using natural language processing.

12. The method of claim 8, further comprising:
determining at least one failure of the output transcription file to match the baseline document based on comparing the output transcription file to the baseline document; and
providing feedback of the at least one failure for training of the machine learning model.

13. The method of claim 8, further comprising:
analyzing the evaluation data output report;
mapping the evaluation data output report with a list of accessibility checkpoints; and
generating a checkpoint satisfaction report specifying checkpoints that are satisfied.

14. The method of claim 8, wherein the baseline document includes a pre-defined order for reading the screen content elements, the method further comprising:
determining, based on comparing the output transcription file to the baseline document, a sequence error in a sequence of text that represents an order in which the screen reader reads the screen content elements, wherein the sequence of text fails to match with the pre-defined order specified by the baseline document.

15. A non-transitory computer-readable storage medium carrying program instructions thereon for evaluating screen content for accessibility with a screen reader device, the instructions when executed by one or more processors cause the one or more processors to perform operations comprising:
receiving a baseline document including a script of expected screen content conformed to one or more accessibility requirements;
evaluation screen content of one or more user devices displaying the screen content, the evaluation comprising:
generating an audio file by capturing speech from the screen reader device in reading screen content elements;
feeding the audio file into a machine learning model;
transcribing, by the machine learning model, the audio file into a preliminary output transcription file;
ascertaining, by the machine learning model, whether the preliminary output transcription file associated with the audio file meets or is below an accuracy threshold;

upon the ascertaining that the preliminary output transcription file is below the accuracy threshold, the machine learning model:
- evaluates the audio file to determine a refinement metric for the generating the audio file;
- adjusts one or more parameters for the generating the audio file according to the refinement metric, wherein the adjusts one or more parameters include one or more of changing a speech rate, altering a speech pace, filtering noise, or enhancing clarity of the audio file; and
- repeats the generating the audio file based on the adjusted one or more parameters until the accuracy threshold is met;

upon the ascertaining that the preliminary output transcription file meets the accuracy threshold, the machine learning model generates an output transcription file;

determining whether the output transcription file matches the baseline document; and generating an evaluation data output report of the screen content for accessibility based on a comparison of the output transcription file to the baseline document.

16. The storage medium of claim 15, wherein the one or more user devices include a plurality of user devices of one or more different types, models, platforms, or platform versions, and wherein the evaluation of the screen content is performed simultaneously for the plurality of user devices.

17. The storage medium of claim 15, wherein the operations further comprise:
- training the machine learning model via a training module implementing a supervised learning algorithm with training transcription data content comprising ground truth input with known specific terms and corresponding outputs; and
- training the machine learning in an iterative manner with feedback data.

18. The storage medium of claim 15, wherein the transcribing by the machine learning model is performed using natural language processing.

19. The storage medium of claim 15, wherein the operations further comprise:
- determining a failure of the output transcription file to conform based on the comparing of the output transcription file to the baseline document; and
- providing feedback of the failure for training of the machine learning model.

20. The storage medium of claim 15, wherein the baseline document includes a pre-defined order for reading the screen content elements, the operations further comprising:
- determining, based on the comparing of the output transcription file to the baseline document, a sequence error in a sequence of text that represents an order in which the screen reader reads the screen content elements, wherein the sequence of text fails to match with the pre-defined order specified by the baseline document.

* * * * *